US008439802B2

(12) United States Patent
Suzuki et al.

(10) Patent No.: US 8,439,802 B2
(45) Date of Patent: May 14, 2013

(54) SPEED CHANGE CONTROL DEVICE OF AUTOMATIC TRANSMISSION (75) Inventors: Masami Suzuki, Mishima (JP); Fumihiro Yamanaka, Hiratsuka (JP)

(73) Assignee: Jatco Ltd, Fuji-shi (JP)

( * ) Notice: Subject to any disclaimer, the term of this patent is extended or adjusted under 35 U.S.C. 154(b) by 0 days.

(21) Appl. No.: 13/362,524

(22) Filed: Jan. 31, 2012

(65) Prior Publication Data
US 2012/0202647 A1 Aug. 9, 2012

(30) Foreign Application Priority Data

Feb. 3, 2011 (JP) ................................. 2011-021672

(51) Int. Cl.
*B60W 10/00* (2006.01)
(52) U.S. Cl.
USPC ............................................. 477/77; 477/115
(58) Field of Classification Search .................... 477/70, 477/77, 79, 83, 84, 115, 120, 121
See application file for complete search history.

(56) References Cited

U.S. PATENT DOCUMENTS

| 5,445,579 | A | 8/1995 | Fujita et al. |
| 7,006,907 | B2 * | 2/2006 | Usuki et al. ...................... 701/51 |
| 2008/0153667 | A1 * | 6/2008 | Ishii et al. ...................... 477/115 |
| 2008/0300104 | A1 * | 12/2008 | Park et al. ...................... 477/80 |
| 2012/0115680 | A1 * | 5/2012 | Hase et al. ...................... 477/79 |

FOREIGN PATENT DOCUMENTS

JP    3097339 B2    10/2000

* cited by examiner

*Primary Examiner* — Justin Holmes
(74) *Attorney, Agent, or Firm* — Foley & Lardner LLP

(57) ABSTRACT

A speed change control device of an automatic transmission comprises a first control section that, upon detecting a speed change instruction for a speed change from a first given speed to a second given speed, carries out the speed change by reducing an engaging pressure of a releasing side frictional element that has established the first given speed and increasing an engaging pressure of an engaging side frictional element that would establish the second given speed; a second control section that carries out a correction processing to increase the engaging pressure of the releasing side frictional element when a throttle open degree is increased during the speed change carried out by the first control section; and a third control section that inhibits the correction processing of the second control section when the engaging pressure of the releasing side frictional element is lower than a given value.

12 Claims, 8 Drawing Sheets

SPEED CHANGE CONTROL DEVICE OF AUTOMATIC TRANSMISSION

BACKGROUND OF THE INVENTION

1. Field of the Invention

The present invention relates in general to stepwise variable automatic transmissions, and more particularly to a speed change control device of such stepwise variable automatic transmissions.

2. Description of the Related Art

Hitherto, in the stepwise variable automatic transmissions, the speed change is made by releasing a frictional element (viz., releasing side frictional element) that has established a speed before the speed change and engaging another frictional element (viz., engaging side frictional element) that will establish a speed after the speed change.

Japanese Patent 3097339 shows a stepwise variable automatic transmission that is equipped with unique means by which when an accelerator pedal is depressed during speed change, an engaging pressure of the releasing side frictional element is increased to restrain fluctuations of turbine speed.

SUMMARY OF THE INVENTION

However, even with such unique means, undesired shift shock (or speed change shock) tends to occur in the following case. That is, when, during a speed change with the engaging pressure of the releasing side frictional element being sufficiently lowered, the accelerator pedal is depressed, the engaging pressure of the releasing side frictional element is increased in accordance with the depression degree of the accelerator pedal (or throttle open degree). Upon this, so-called overshoot of the engaging pressure tends to occur, which causes undesired shift shock.

The present invention is provided by taking the above-mentioned drawbacks of known means into consideration.

It is therefore an object of the present invention to provide a speed change control device of an automatic transmission, which is free of the above-mentioned drawbacks.

That is, in accordance with the present invention, there is provided a speed change control device of an automatic transmission, which suppresses or at least minimizes the undesired shift shock even when, during speed change, an accelerator pedal is depressed.

In accordance with a first aspect of the present invention, there is provided a speed change control device of an automatic transmission, the automatic transmission transmitting a torque inputted thereto from a power unit to an output shaft thereof while changing a rotation speed of the output shaft to a desired speed. The speed change control device comprises a first control section that, upon detecting a speed change instruction for a speed change from a first given speed ($2^{nd}$ speed) to a second given speed ($1^{st}$ speed), carries out the speed change by reducing an engaging pressure of a releasing side frictional element (23) that has established the first given speed and increasing an engaging pressure of an engaging side frictional element (22) that would establish the second given speed; a second control section that carries out a correction processing to increase the engaging pressure of the releasing side frictional element (23) when a throttle open degree is increased during the speed change carried out by the first control section; and a third control section that inhibits the correction processing of the second control section when the engaging pressure of the releasing side frictional element (23) is lower than a given value.

In accordance with a second aspect of the present invention, there is provided a method of controlling an automatic transmission, the automatic transmission transmitting a torque inputted thereto from a power unit to an output shaft thereof while changing a rotation speed of the output shaft to a desired speed. The method comprises in steps detecting a speed change instruction for a speed change from a first given speed ($2^{nd}$ speed) to a second given speed ($1^{st}$ speed); carrying out the speed change by reducing an engaging pressure of a releasing side frictional element (23) that has established the first given speed and increasing an engaging pressure of an engaging side frictional element (22) that would establish the second given speed; carrying out a correction processing to increase the engaging pressure of the releasing side frictional element (23) when a throttle open degree is increased during the speed change carried out by the first control section; and inhibiting the correction processing of the second control section when the engaging pressure of the releasing side frictional element (23) is lower than a given value.

Accordingly, in the speed change control device of an automatic transmission of the invention, in case wherein the engaging pressure of the releasing side frictional element is lower than the given value, the engaging pressure is not increased even when the throttle open degree is increased, and thus, the speed change of the transmission can be smoothly carried out without being subjected to a shift shock.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

In the following, embodiments of the present invention will be described in detail with reference to the accompanying drawings.

First Embodiment

First, a first embodiment of the present invention will be described in detail with reference to FIGS. 1 to 6 of the drawings.

Figure 1:
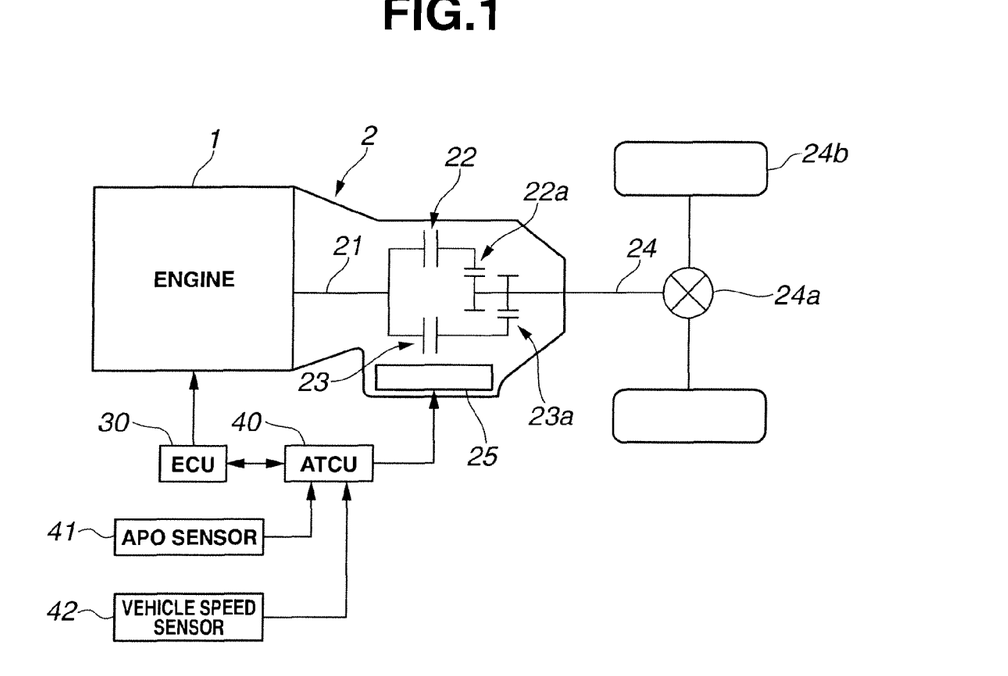
FIG. 1 is a systematic view of a motor vehicle equipped with a speed change control device of an automatic transmission which is a first embodiment of the present invention.

Referring to FIG. 1, there is schematically shown a motor vehicle equipped with a speed change control device of an automatic transmission, which is the first embodiment.

Denoted by numerals 1 and 2 in FIG. 1 are respectively an internal combustion engine and an automatic transmission which are mounted on the motor vehicle. The automatic transmission 2 is of a stepwise variable type. The internal combustion engine 1 and the automatic transmission 2 are controlled by an engine control unit (ECU) 30 and an automatic transmission control unit (ATCU) 40 respectively. More specifically, as will be seen from FIG. 1, the engine control unit (ECU) 30 controls an operation of the engine 1 in accordance with both a throttle open degree detected by an APO sensor 41 and a vehicle speed detected by a vehicle speed sensor 42. More specifically, the engine control unit 30 controls operation of fuel injection valves and ignition plugs of the engine 1.

Based on the throttle open degree detected by the APO sensor 41, the vehicle speed detected by the vehicle speed sensor 42 and a shift lever position detected by an inhibitor switch (not shown), the automatic transmission control unit 40 determines a speed suitable for a present running condition of the vehicle with the aid of a shift map (see FIG. 2) installed therein and issues to a hydraulic pressure control circuit 25 an instruction for achieving the suitable speed.

Figure 2:
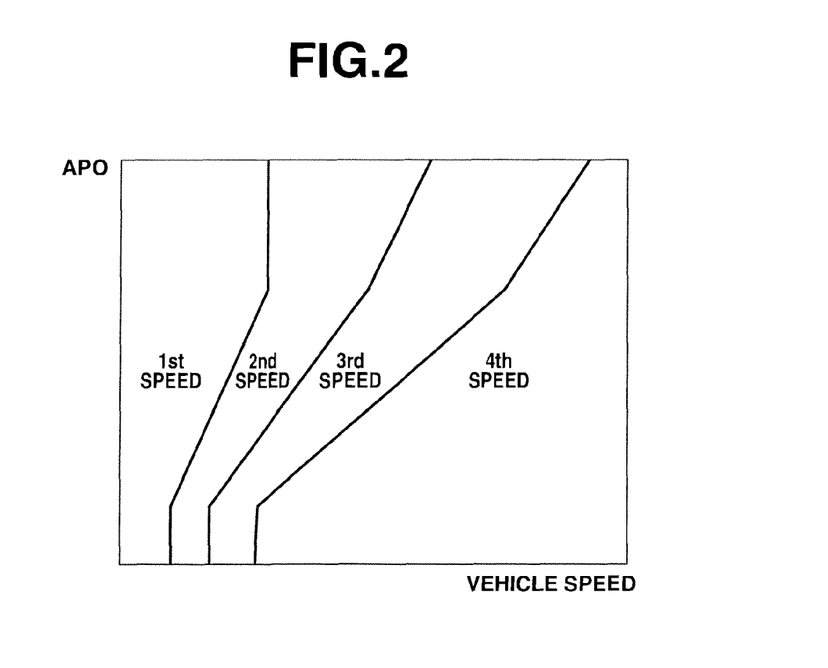
FIG. 2 is a shift map employed in the first embodiment.

As is seen from FIG. 2, the shift map is a map that shows a vehicle speed at the X-axis, a throttle open degree at the Y-axis and suitable shift change zones on a flat surface defined by the X and Y axes. That is, in control, a shift change zone defined by both the present vehicle speed and present throttle open degree is selected as a zone for a target speed. Since the shift map is well known, the detailed explanation on it will be omitted.

The hydraulic pressure control circuit 25 functions to feed a controlled hydraulic pressure to an engaging side frictional element 22, a releasing side frictional element 23, clutches (not shown) and brakes (not shown) which are all installed in the automatic transmission 2. That is, upon issuing control signals from the automatic transmission control unit (ATCU) 40, solenoids installed in the control circuit 25 receive corresponding instruction signals for achieving a desired speed of the transmission 2.

In the automatic transmission 2, there are installed a plurality of planetary gear units that function to establish a plurality of speeds of the transmission 2. Since the planetary gear units are well known, detailed explanation on them will be omitted.

Within the automatic transmission 2, there are installed the engaging side frictional element 22 that is engaged when establishing a first given speed (viz., the speed established by a speed change) and the releasing side frictional element 23 that is engaged when establishing a second given speed (viz., the speed held before the speed change) and released when establishing the first given speed.

When the engaging side frictional element 22 becomes engaged, an engine torque from the engine 1 is transmitted to a transmission output shaft 24 through a transmission input shaft 21 and a first speed gear unit 22a, and transmitted to drive road wheels 24b through a differential gear 24a.

While, when the releasing side frictional element 23 becomes engaged, the engine torque from the engine 1 is transmitted to the transmission output shaft 24 through the transmission input shaft 21 and a second speed gear unit 23a, and transmitted to the drive road wheels 24b through the differential gear 24a.

It is to be noted that as is well known in the art, similar power train mechanism is employed for each given speed.

FIG. 2 shows a shift map that is practically employed in the first embodiment. This shift map shown in this drawing is designed for a stepwise variable automatic transmission having four speeds, which are $1^{st}$ speed, $2^{nd}$ speed, $3^{rd}$ speed and $4^{th}$ speed. If the transmission has more speeds, for example, five speeds, a shift map designed for a five speed automatic transmission is used. By employing such shift map, the transmission 2 can establish a speed suitable for the present running condition of the motor vehicle with respect to a vehicle speed and a throttle open degree (or depression degree of an accelerator pedal).

Figure 3:
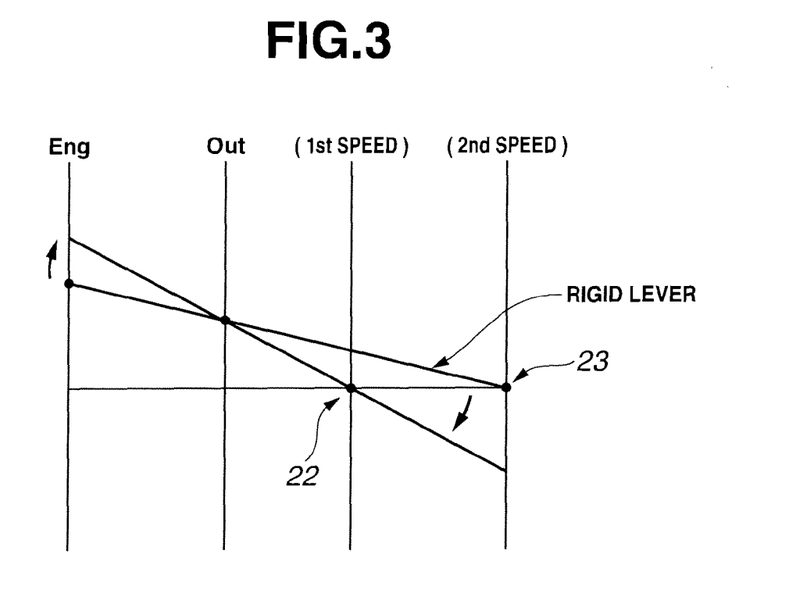
FIG. 3 is a common speed diagram depicting a downshift in case of the first embodiment.

FIG. 3 is a common speed diagram depicting a speed change (downshift) of the automatic transmission in the first embodiment of the present invention. This diagram shows, as an example, a condition where the first and second speeds are established. Even in case of an automatic transmission that employs a different common speed diagram, the basic operation is substantially the same as that of FIG. 3. That is, for establishing the second speed, the releasing side frictional element 23 is engaged. Upon this, the engine torque from the engine 1 is subjected to a speed reduction and outputted from the transmission output shaft 24. When, under this condition, a downshift instruction is issued, the engaging pressure of the releasing side frictional element 23 is lowered and at the same time the engaging pressure of the engaging side frictional element 22 is increased, so that a so-called rigid lever is rotated about an axis of the transmission output shaft thereby to establish the first speed.

If, under this condition, a downshift is intended, increasing the rotation speed of the engine 1 is needed, and thus, the engine 1 is subjected to a rotation speed control so that the rotation speed of the engine 1 is controlled to a speed that is to be established upon completion of the speed change of the transmission. Particularly, when the motor vehicle is under a coast running condition and thus the driver does not depress the accelerator pedal, the engine rotation speed has a tendency to be lowered. Thus, in such case, the engine rotation speed is increased by the work of the engine speed control. With this control, when the motor vehicle is under D-range running, unexpected sudden rise of engine speed is suppressed, and when the motor vehicle is under the coast running, synchronous rotation between the engine and the transmission is promoted. Furthermore, when, during the speed change, the accelerator pedal is depressed to cause increase of the throttle open degree, a so-called compensating control is applied to the releasing side frictional element to increase the engaging pressure of the releasing side frictional element. That is, when, due to depression of the accelerator pedal, the engine torque is increased, the rigid lever is rotated fast, which tends to induce undesired shift shock. Accordingly, for suppressing such undesired shift shock, a correction processing is so made that the engaging pressure of the releasing side frictional element is increased in accordance with the throttle open degree thereby to suppress an excessive rotation of the rigid lever. This excessive rotation is controlled also by the rotation speed control.

In the following, a task that is to be established by the present invention will be described.

As is described hereinabove, when, during the downshift speed change, the accelerator pedal is depressed, a correction processing is so made as to increase the engaging pressure of the releasing side frictional element for making the condition of the rigid lever stable. However, if such engaging pressure increasing correction processing is carried out under a condition wherein the engaging pressure of the releasing side frictional element has been lowered to a certain level, a so-called overshoot of the engaging pressure is induced in stead of doing, which causes induction of the undesired shift shock.

In the following, the mechanism of the shift shock mentioned hereinabove will be discussed with the aid of FIG. 4.

Figure 4:
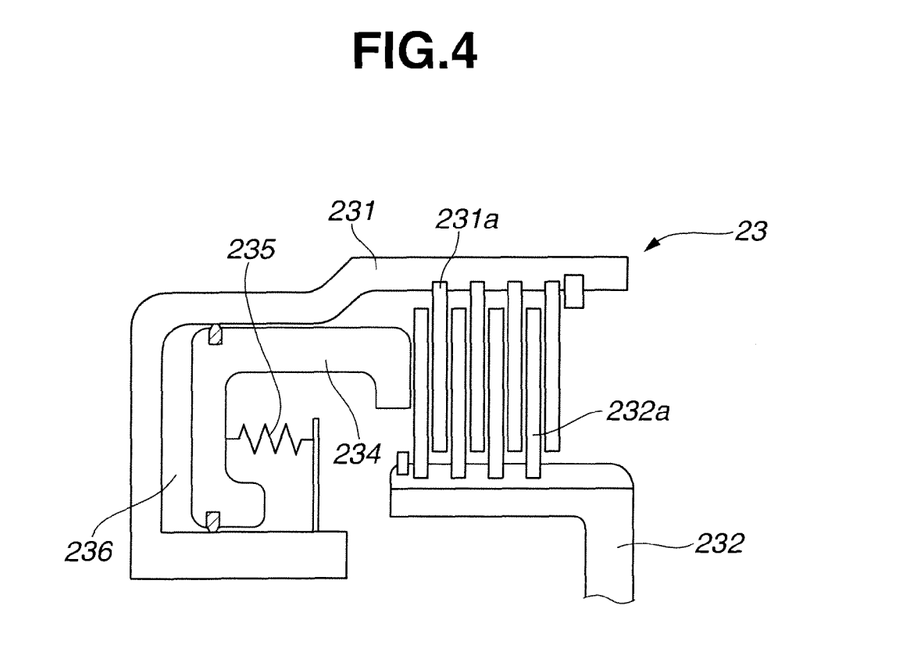
FIG. 4 is a schematic view of a releasing side frictional element employed in the first embodiment.

FIG. 4 shows a schematic view of a releasing side frictional element 23 installed in the automatic transmission that employs the speed change control device of the first embodiment of the invention.

As shown, the releasing side frictional element 23 comprises a plurality of clutch plates 231a that are connected to a drive side rotation member 231 through a spline connection, a plurality of clutch plates 232a that are connected to a driven side rotation member 232 through a spline connection, a piston 234 that presses these clutch plates 231a and 232a to suppress relative rotation therebetween, a return spring 235 that biases the piston 234 in a direction to release the clutch plates 231a and 232a and a cylinder chamber 236 that contains a hydraulic fluid.

When an engaging pressure (viz., pressurized hydraulic fluid) for the releasing side frictional element 23 is led into the cylinder chamber 236, the piston 234 is moved rightward in FIG. 4 against the force of the return spring 235 to press the clutch plates 231a and 232a. During the rightward movement of the piston 234, a so-called rattle suppression work (or backlash suppression work) is gradually applied to the clutch plates 231a and 232a and thus, during this rattle suppressing work doing, the releasing side frictional element 23 fails to provide a torque transmission capacity (or function). However, once the piston stroke is finished completing the rattle suppression work, the releasing side frictional element 23 starts to provide a torque transmission capacity (or function) in accordance with the engaging pressure of the releasing side frictional element 23.

If, under this condition, the engaging pressure of the releasing side frictional element 23 is gradually lowered, the following phenomena would take place.

That is, when the biasing force produced by the engaging pressure of the releasing side frictional element 23 is still larger than the biasing force of the return spring 235, the piston 234 is not moved (that is, the piston 234 takes the maximum extended position or rattle suppression position), and thus, if, under this condition, a higher engaging pressure is applied to the releasing side frictional element 23, the frictional element 23 is able to produce a torque transmission capacity in accordance with the applied pressure. In other words, in this case, the releasing side frictional element 23 exhibits a relatively good controllability.

However, when the engaging pressure of the releasing side frictional element 23 is sufficiently lowered to a level lower than the biasing force of the return spring 235, the piston 234 begins to move leftward in FIG. 4. When, under this condition, a higher engaging pressure is applied to the releasing side frictional element 23, an initial hydraulic pressure is consumed by the piston stroke and a subsequent hydraulic pressure functions to instantly engage the clutch plates 231a and 232a. Thus, the cylinder chamber 236 is subjected to rapid volume fluctuations and the torque transmission capacity is rapidly increased, which causes the possibility of undesired shift shock. Particularly, when, under a coast running condition, the accelerator pedal is suddenly depressed, such undesired shift shock tends to occur because the engaging pressure of the releasing side frictional element is instantly increased during the time for which the engaging pressure of the releasing side frictional element is intended to be drawn rapidly.

Accordingly, in the first embodiment of the present invention, when, during a downshift speed change, the accelerator pedal is depressed, the following technique is practically employed.

That is, when, in response to the above-mentioned depression of the accelerator pedal, the engaging pressure of the releasing side frictional element 23 is found to be lowered to a given level matched with the biasing force of the return spring 235 applied to the piston 234 in the rattle suppression position, a correction processing for increasing the engaging pressure of the releasing side frictional element 23 is prohibited judging that the piston 234 has just started its stroke.

The detail of the first embodiment of the invention will be described in the following.

Figure 5:
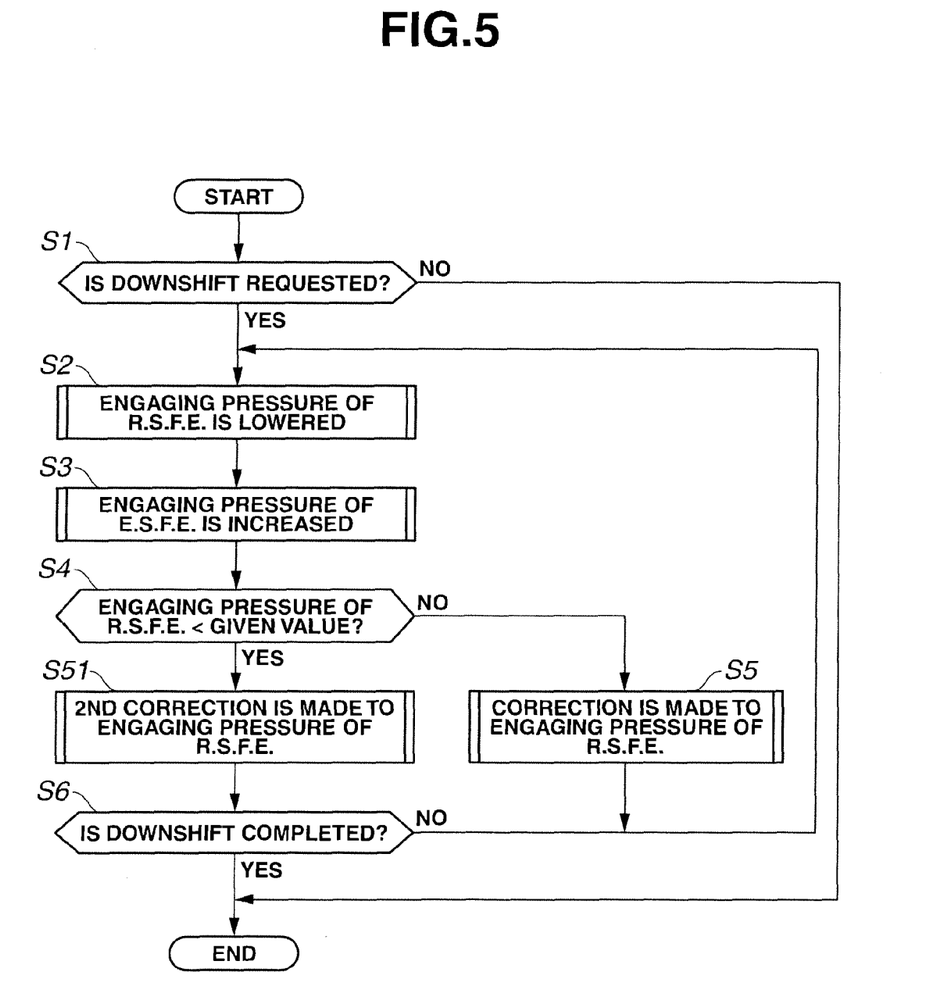
FIG. 5 is a flowchart showing programmed operation steps that are executed when a downshift speed change control is carried out in the first embodiment.

FIG. 5 is a flowchart that depicts programmed operation steps executed by the automatic transmission control unit 40 when a downshift speed change control is carried out in the first embodiment. For carrying out an upshift speed change control, a similar flowchart can be used.

In the flowchart of FIG. 5, at step S1, judgment is carried out as to whether a downshift has been requested or not. If YES, that is, when it is judged that the downshift has been requested, the operation flow goes to step S2. If NO, that is, when it is judged that the downshift has not been requested, the operation flow goes to END.

At step S2, the engaging pressure of the releasing side frictional element 23 is lowered. More specifically, at first, the engaging pressure of the releasing side frictional element 23 is reduced by a degree of safety factor causing the frictional element 23 to be on the verge of slipping and thereafter the engaging pressure is gradually reduced with a given gradient (or given reduction rate). It is to be noted that this engaging pressure reduction manner is suitably set in accordance with a running condition of an associated motor vehicle, for example, an engine torque inputted to the transmission.

At step S3, the engaging pressure of the engaging side frictional element 22 is increased. More specifically, by using a pre-charge processing, a rattle suppression work for the piston stroke is carried out, and when it is recognized that the releasing side frictional element 23 has come to the verge of slipping, the engaging pressure of the engaging side frictional element 22 is gradually increased.

At step S4, judgment is carried out as to whether or not the engaging pressure of the releasing side frictional element 23 is lower than a given value that is balanced with the biasing force of the return spring 235. If YES, that is, when it is judged that the engaging pressure of the releasing side frictional element 23 is lower than the given value, the operation flow goes to step S51. While, if NO, that is, when it is judged that the engaging pressure of the releasing side frictional element 23 is equal to or higher than the given value, the operation flow goes to step S5.

At step S5, a correction processing is carried out for the engaging pressure of the releasing side frictional element 23. More specifically, the correction processing is so made as to increase the engaging pressure of the releasing side frictional element 23 in accordance with a throttle open degree detected by the APO sensor 41, and then, the operation flow goes back to step S2.

At step S51, a second correction processing is carried out for the engaging pressure of the releasing side frictional element 23. Specifically, the second correction processing is so made as to reduce the engaging pressure of the releasing side frictional element 23 in accordance with the throttle open degree detected by the APO sensor 41. More specifically, the second correction processing is so made as to moderate a reduction gradient (or reduction rate) with which the engaging pressure of the releasing side frictional element 23 is gradually reduced in accordance with a throttle open degree detected by the APO sensor 41. That is, if the throttle open degree is large, the reduction rate is reduced for slowly releasing the releasing side frictional element 23, and if the throttle open degree is small, the reduction rate is increased for quickly releasing the releasing side frictional element 23. Then, the operation flow goes to step S6. This step S51 corresponds to a gradient correction means.

At step S6, judgment is carried out as to whether a desired downshift has been completed or not. If YES, that is, when it is judged that the downshift has been completed, the operation flow goes to step END finishing the control flow. While, if NO, that is, when it is judged that the downshift has not been completed, the operation flow goes back to step S2.

Figure 6:
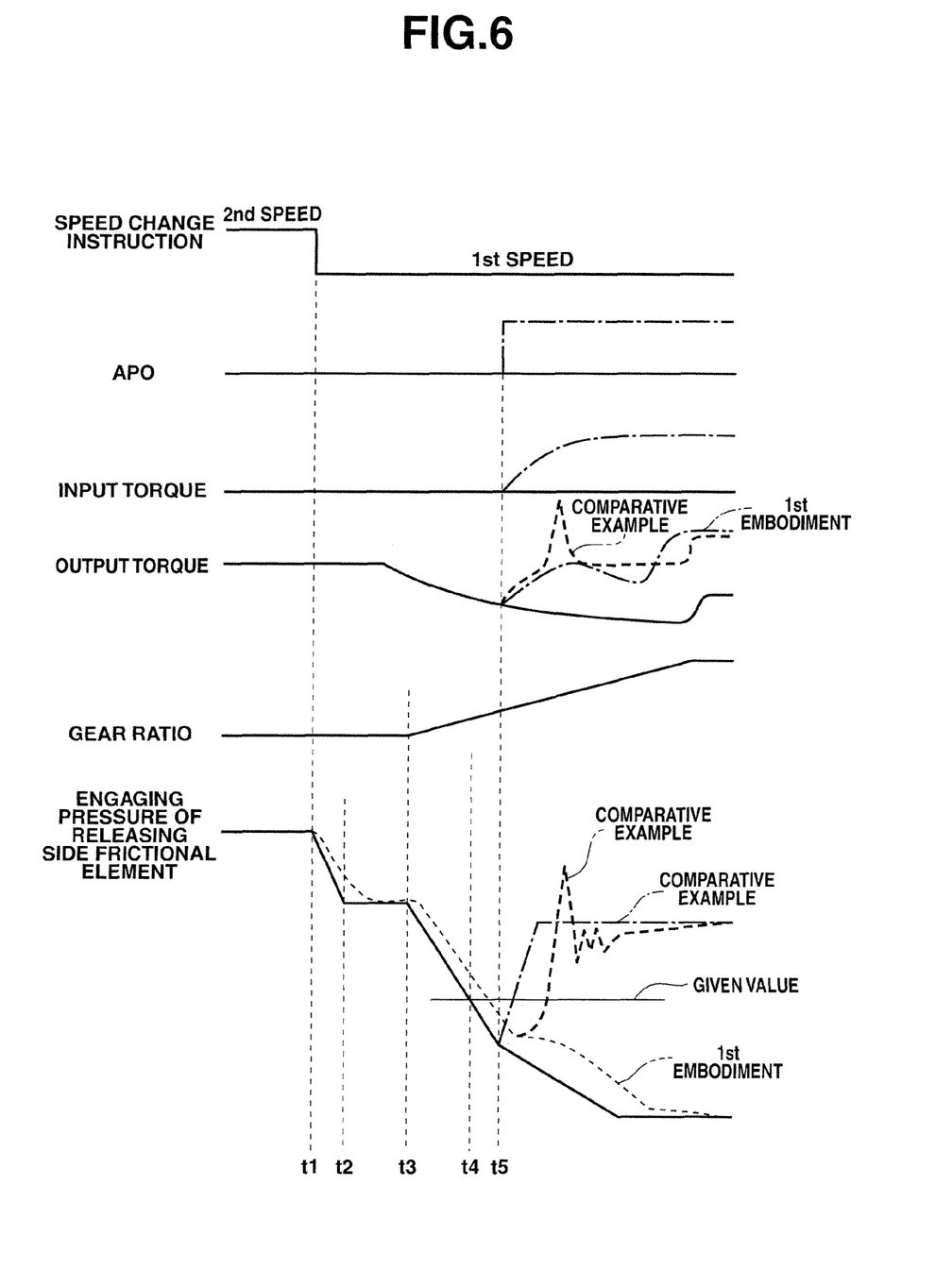
FIG. 6 is a time chart that depicts the downshift speed change control of the first embodiment with respect to an elapsed time.

FIG. 6 is a time chart that depicts the downshift speed change control effected by the first embodiment of the present invention. Initial condition is such that under a coast running of an associated motor vehicle with an accelerator pedal kept not depressed, a downshift request from the second speed to the first speed has been outputted.

In the time chart of FIG. 6, the solid lines depict a case wherein the downshift is carried out under the coast running condition and the dot-dash lines depict a case wherein the accelerator pedal is depressed during the downshift under the coast running.

Furthermore, in the time chart of FIG. 6, the thick dotted lines depict a case (which will be referred to as "comparative example" hereinafter) wherein the correction processing (viz., step S5) for the engaging pressure of the releasing side frictional element 23 is carried out in response to a depression of the accelerator pedal after the engaging pressure of the releasing side frictional element 23 has become lower than the given value, and the dot-dash line of the engaging pressure of the releasing side frictional element 23 indicates an instruction value for the engaging pressure of the releasing side frictional element 23 of the comparative example.

Furthermore, in the time chart of FIG. 6, the thin dotted line of the engaging pressure of the releasing side frictional element 23 depicts a case (viz., first embodiment) wherein the second correction processing (viz., step S51) for the engaging pressure of the releasing side frictional element 23 is carried out in response to a depression of the accelerator pedal after the engaging pressure of the releasing side frictional element 23 has become lower than the given value.

At time t1, a downshift request from the second speed to the first speed is outputted. Upon this, the engaging pressure of the releasing side frictional element 23 is reduced to the verge of slipping of the frictional element 23 with the given gradient (viz., given reduction rate). From time t2 to time t3, the reduced engaging pressure of the releasing side frictional element 23 is kept unchanged and a pre-charge processing for the engaging side frictional element 22 is carried out.

Once the pre-charge processing for the engaging side frictional element 22 is finished at time t3, the engaging pressure of the releasing side frictional element 23 is gradually reduced. If, during this pressure reducing time, the accelerator pedal is depressed, the engaging pressure increasing correction processing is suitably carried out for the releasing side frictional element 23 in accordance with the throttle open degree by the correction processing for the engaging pressure of the releasing side frictional element 23 (viz., step S5).

If the engaging pressure of the releasing side frictional element 23 becomes lower than the given value at time t4, the engaging pressure increasing correction processing for the releasing side frictional element 23 is stopped.

When the accelerator pedal is depressed at time t5, the engine torque is increased and thus an input torque of the transmission starts to increase accordingly. Upon this, in case of the comparative example depicted by the thick dotted line, the correction processing for the engaging pressure of the releasing side frictional element (viz., step S5) is carried out. However, in this case, as has been mentioned in the explanation of FIG. 4, the piston 234 is kept away from the clutch plates 231*a* and 232*a*, and thus, if, under this condition, the correction processing for increasing the engaging pressure of the releasing side frictional element 23 is carried out in accordance with the throttle open degree, the engaging pressure of the releasing side frictional element 23 is instantly increased upon completion of the rattle suppression work for the clutch plates 231*a* and 232*a*, and thus, undesired shift shock is caused to occur. Furthermore, since usually an associated hydraulic actuator does not have a satisfied responsivity, the extent of the shift shock is not so small.

While, in case of the first embodiment of the present invention, the second correction processing (viz., step S51) is employed for solving the above-mentioned drawbacks. With such second correction processing, increase of the engaging pressure of the releasing side frictional element 23 is stopped and the reduction rate of the engaging pressure is slowly or gently changed in accordance with the throttle open degree, and thus, the engaging pressure of the releasing side frictional element 23 is ideally reduced like in case of the coast running condition of the vehicle. Accordingly, the speed change from the second speed to the first speed is quickly completed without inducing undesired shift shock. Furthermore, since, after completion of the speed change, the vehicle is allowed to run with an input torque in accordance with the throttle open degree, the drivability of the vehicle is increased.

It is to be noted that the way of speed change described hereinabove is applicable to a one-step speed change from the second speed to the third speed and a two-step speed change from, for example, the second speed to the fourth speed.

As will be understood from the above description, according to the first embodiment, the following advantageous operation effects are obtained.

(1) That is, in the first embodiment, there is provided a speed change control device for an automatic transmission. The automatic transmission transmits a torque inputted to an input shaft thereof from an engine 1 (or power unit) to an output shaft thereof while changing a rotation speed of the inputted torque to a desired rotation speed for the output shaft.

The speed change control device comprises a first control section (viz., ATCU 40) that, upon detecting a speed change instruction for a change from a first given speed kept established before the speed change to a second given speed to be established after the speed change, effects a speed change by reducing an engaging pressure of a releasing side frictional element 23 that has established the first given speed and increasing an engaging pressure of an engaging side frictional element 22 that establishes the second given speed; a second control section (or step S5) that carries out a correction processing to increase the engaging pressure of the releasing side frictional element 23 when a throttle open degree is increased during the control by the first control section; and a third control section (or S51) that inhibits the correction processing of the second control section when the engaging pressure of the releasing side frictional element 23 is lower than a given value.

Accordingly, when the engaging pressure of the releasing side frictional element 23 is lower than the given value, the engaging pressure of the releasing side frictional element 23 is not increased even if the throttle open degree is increased, and thus, the speed change can be speedily carried out while suppressing the undesired shift shock.

(2) During the speed change effected by the first control section (viz., ATCU 40), the engine 1 is subjected to a speed control. Accordingly, the engine speed can be speedily synchronized with the speed (viz., the second given speed) that the automatic transmission has established after the speed change, and thus, it is possible to carry out a smoothed speed change without inducing unexpected sudden rise of engine speed.

(3) As is seen from FIG. 4, the releasing side frictional element 23 is provided with the return spring 235 that biases the piston 234 in a direction to release the clutch plates 231a and 232a, and the given value of the step S4 (see FIG. 5) corresponds to the biasing force of the return spring 235 at the time when the piston 234 has completed the rattle suppression work for the clutch plates 231a and 232a. Accordingly, when the volume of the piston chamber is stable in fluctuation, that is, when the piston 234 is at the position of completing the rattle suppression work for the clutch plates 231a and 232a, the speed change in accordance with the input torque can be carried out by increasing the engaging pressure of the releasing side frictional element 23 in accordance with the throttle open degree, and when the volume of the piston chamber has a possibility of high fluctuations, the undesired shift shock can be suppressed by inhibiting the engaging pressure increasing correction proceeding.

Second Embodiment

In the following, a second embodiment of the present invention will be described with reference to FIGS. 7 and 8 of the drawings.

Since a basic construction of the second embodiment is substantially the same as that of the above-mentioned first embodiment, only portions that are different from those of the first embodiment will be described in the following.

Figure 7:
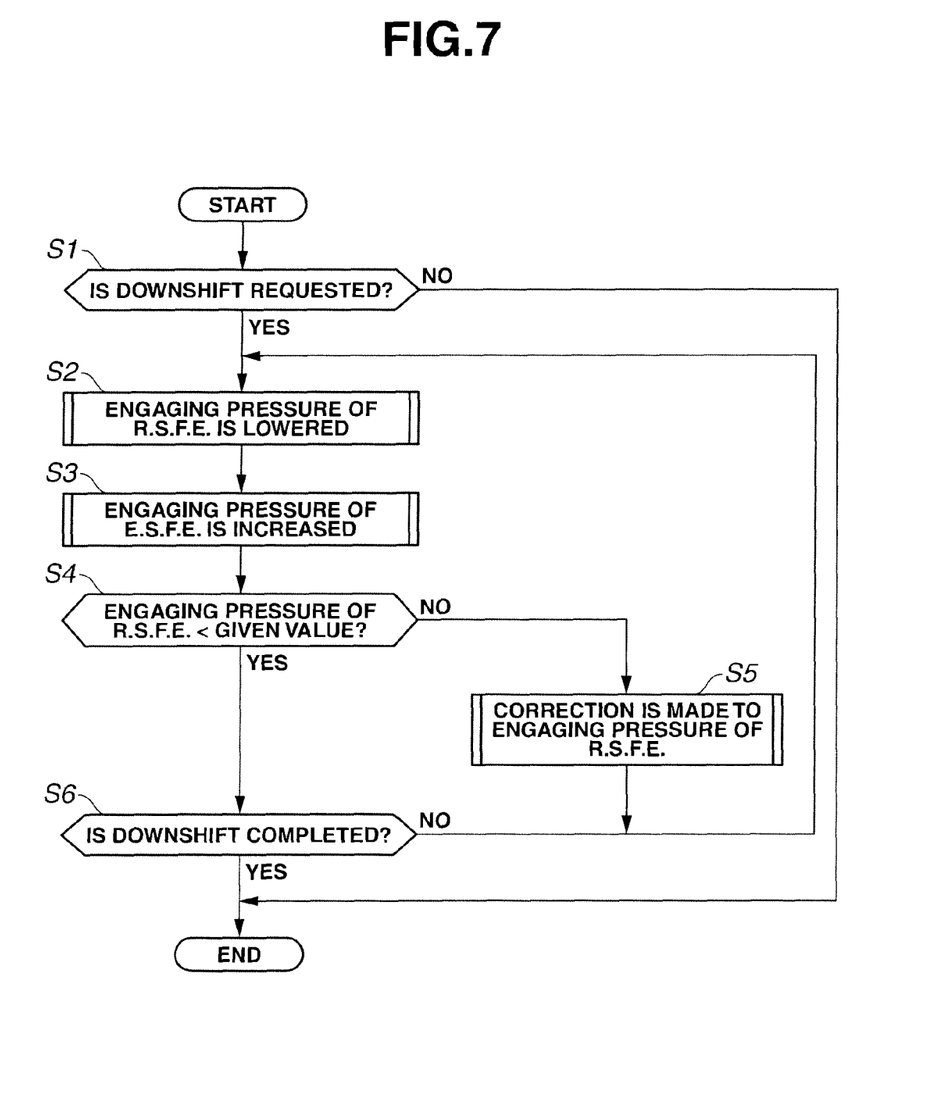
FIG. 7 is a flowchart showing programmed operation steps that are executed when a downshift speed change control is carried out in a second embodiment of the present invention.

FIG. 7 is a flowchart that depicts programmed operation steps executed by an automatic transmission control unit (40) when a downshift speed change control is carried out in the second embodiment.

As will be understood when comparison is made to the flowcharts of FIGS. 5 and 7, in the second embodiment, there is no step that corresponds to step S51 of the first embodiment.

That is, in the above-mentioned first embodiment, at step S51, the second correction processing is carried out for the engaging pressure of the releasing side frictional element 23. That is, in the first embodiment, when the engaging pressure of the releasing side frictional element 23 is lower than the given value, the second correction processing is carried out in stead of the pressure increasing correction applied to the engaging pressure of the releasing side frictional element 23.

While, in the second embodiment, when at step S4 the engaging pressure of the releasing side frictional element 23 is lower than the given value, the operation flow goes to step S6 directly without being subjected to the above-mentioned second correction processing (viz., S51). At step S6, judgment is carried out as to whether a desired downshift has been completed or not. If YES, the operation flow goes to step END finishing the control flow. While, if NO, the operation flow goes back to step S2.

Figure 8:
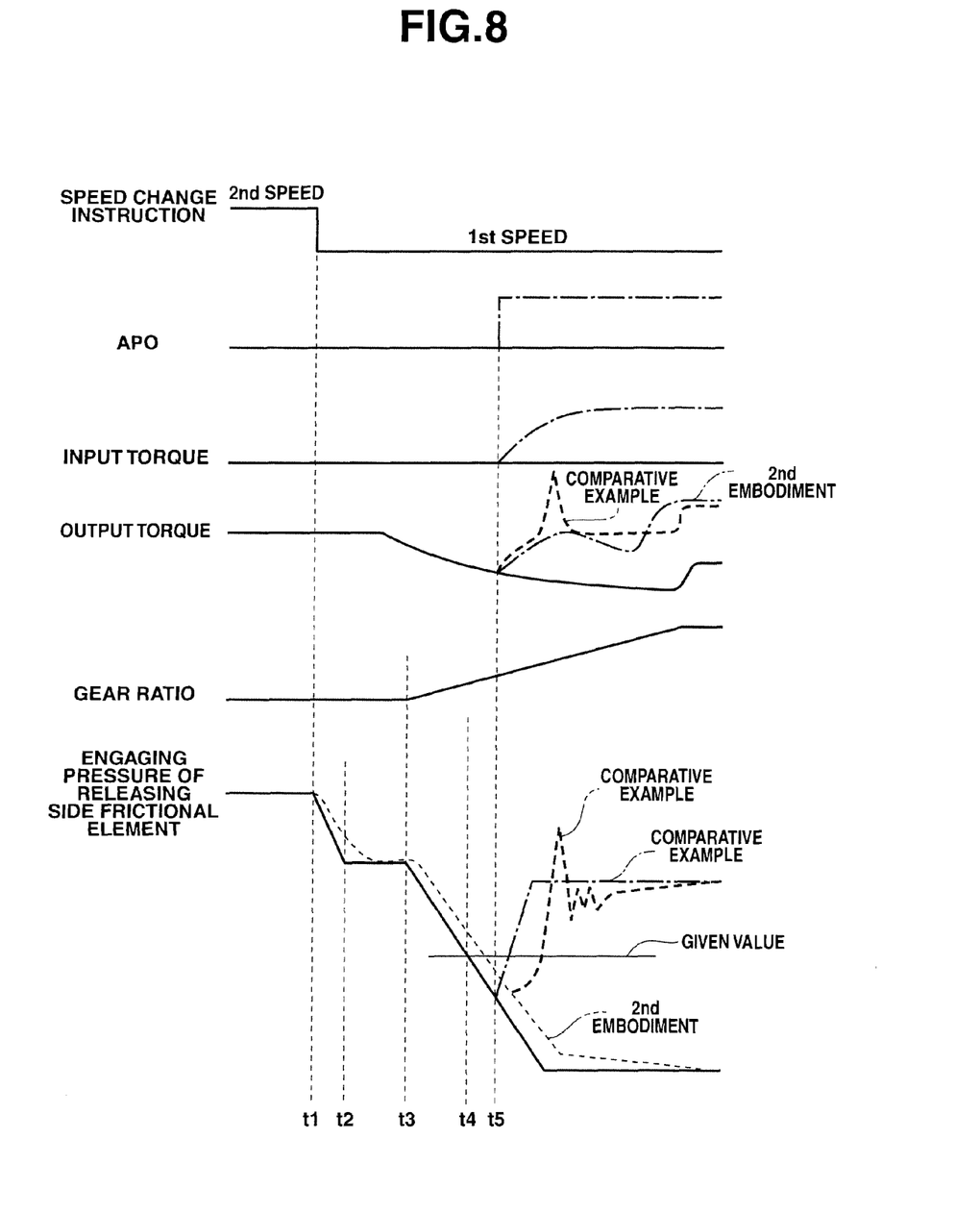
FIG. 8 is a time chart that depicts the downshift speed change control of the second embodiment with respect to an elapsed time.

FIG. 8 is a time chart that depicts the downshift speed change control effected by the second embodiment of the present invention.

Since the time chart of FIG. 8 is basically the same as the above-mentioned time chart of FIG. 6, only portions that are different from those of the time chart of FIG. 6 will be described in the following.

That is, in this second embodiment, even when the accelerator pedal is depressed at time t5, the reduction rate of the engaging pressure of the releasing side frictional element 23 is not changed. In the above-mentioned first embodiment, when the accelerator pedal is depressed at time t5, the reduction rate is slowly or gently changed in accordance with the throttle open degree.

Since advantageous operation effects of the second embodiment are substantially the same as those of the first embodiment, explanation on the same will be omitted.

Third Embodiment

In the following, a third embodiment of the present invention will be described with reference to FIG. 9.

Since a basic construction of the third embodiment is substantially the same as that of the above-mentioned first embodiment, only portions that are different from those of the first embodiment will be described in the following.

Figure 9:
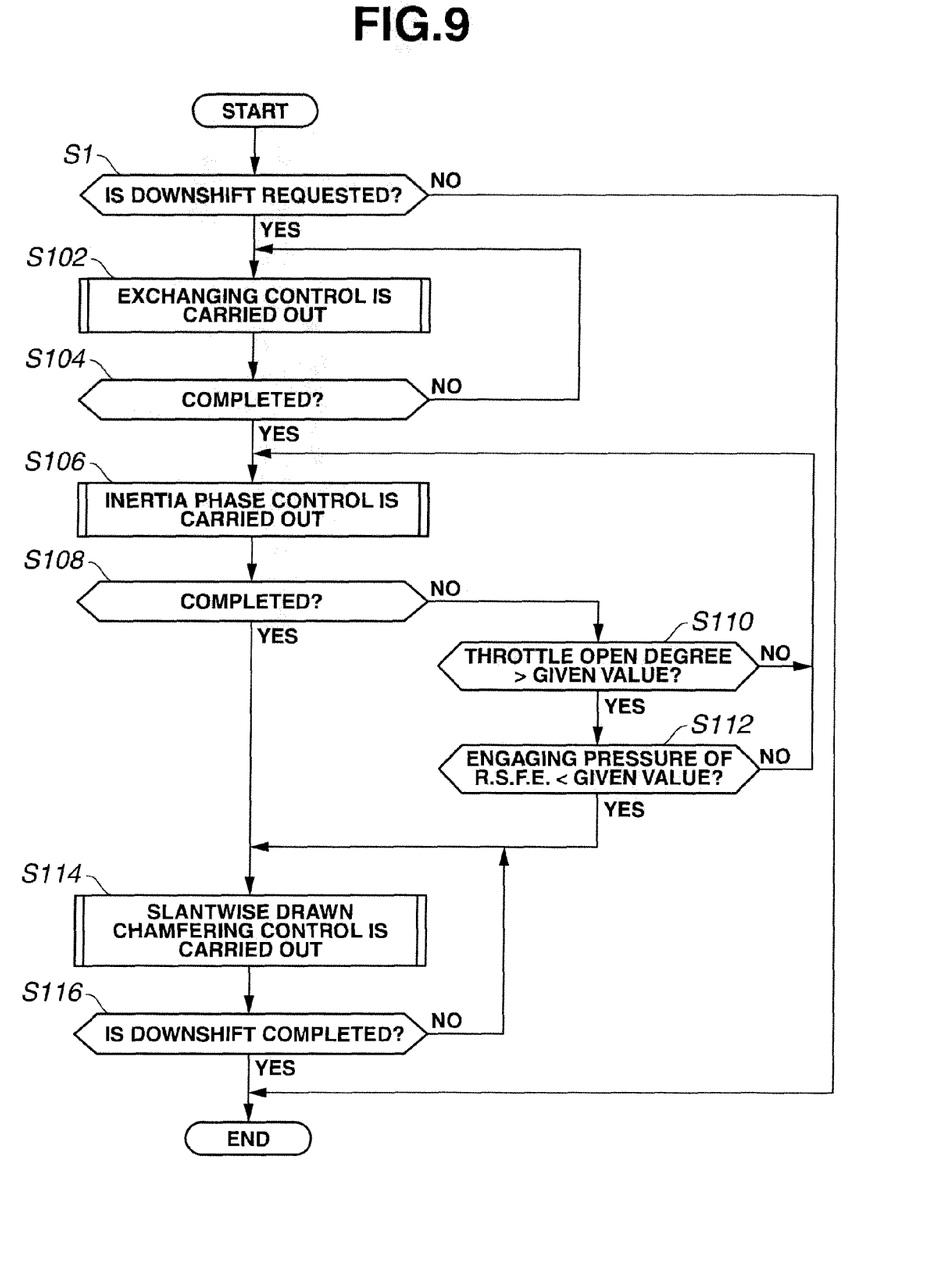
FIG. 9 is a flowchart showing programmed operation steps that are executed when a downshift speed change control is carried out in a third embodiment of the present invention.

FIG. 9 is a flowchart that depicts programmed operation steps executed by an automatic transmission control unit (40) when a downshift speed change control is carried out in the third embodiment.

In the following, the description on control will be directed to only the releasing side frictional element 23. Since the description on control of the engaging side frictional element 22 is substantially the same as that of the above-mentioned first embodiment except for a unique operation, only the unique operation will be described in the following. That is, by the unique operation, the control of the engaging side frictional element 22 after the downshift request is carried out in parallel with the control of the releasing side frictional element 23.

Referring back to the flowchart of FIG. 9, at step S1, judgment is carried out as to whether a downshift has been requested or not. If YES, the operation flow goes to step S102, and if NO, the operation flow goes to END finishing the control flow.

At step S102, a so-called exchanging control is carried out for reducing the engaging pressure of the releasing side frictional element 23. Specifically, at first, the engaging pressure of the releasing side frictional element 23 is reduced by a degree of safety factor causing the releasing side frictional element 23 to be on the verge of slipping and thereafter the engaging pressure is gradually reduced with a given gradient (or given reduction rate). It is to be noted that this engaging pressure reduction way is suitably set in accordance with a running condition of an associated motor vehicle, for example, an engine torque inputted to the transmission. Then, the operation flow goes to step S104.

At step S104, judgment is carried out as to whether a detected gear ratio has reached to a previously set inertia phase judging gear ratio or not. If YES, that is, when it is judged that the detected gear ratio has reached to the inertial phase judging gear ratio, the operation flow goes to step S106 judging that the exchanging control has been completed. While, if NO, that is, when it is judged that the detected gear ratio has not reached to the inertial phase judging gear ratio, the operation flow goes back to step S102 judging that the exchanging control has not been completed.

At step S106, a so-called inertial phase control is carried out for reducing the engaging pressure of the releasing side frictional element 23. By this control, the engaging pressure reduced by the above-mentioned exchanging control is gradually reduced with a gradient (or reduction rate) that is set in accordance with the transmission input torque and the vehicle speed. Then, the operation flow goes to step S108.

At step S108, judgment is carried out as to whether or not a detected gear ratio shows a given gear ratio close to a gear ratio established when the speed change is completed. If YES, that is, when it is judged that the detected gear ratio shows the given gear ratio, the operation flow goes to step S114 judging that the inertia phase control has been completed. While, if NO, that is, when it is judged that the detected gear ratio does not show the given gear ratio, the operation flow goes to step S110 judging that the inertia phase control has not been completed.

At step S110, judgment is carried out as to whether or not the throttle open degree detected by the APO sensor 41 is larger than a previously set given degree. If YES, that is, when it is judged that the detected throttle open degree is larger than the given degree, the operation flow goes to step S112. While, if NO, that is, when it is judged that the detected throttle open degree is not larger than the given degree, the operation flow goes back to step S106 to selectively repeat the operations of steps S106, S108 and S110.

At step S112, judgment is carried out as to whether or not the engaging pressure of the releasing side frictional element 23 is lower than a given value that is balanced with the biasing force of the return spring 235. If YES, that is, when it is judged that the engaging pressure is smaller than the given value, the operation flow goes to step S114. While, if NO, that is, when it is judged that the engaging pressure of the releasing side frictional element 23 is equal to or higher than the given value, the operation flow goes back to step S106 to selectively repeat the operations of steps S106, S108, S110 and S112.

At step S114, a so-called oblique omission chamfer control is carried out for reducing the engaging pressure of the releasing side frictional element 23 and then the operation flow goes to step S116. The slantwise drawn chambering control is a control in which the engaging pressure reduced by the inertial phase control is reduced with a gradient (viz., reduction rate) that is smaller than the gradient (or reduction rate) set at the inertial phase control, so that the reduced engaging pressure is speedily brought to the minimum hydraulic pressure (viz., zero hydraulic pressure) while suppressing torque fluctuations of the output shaft of the transmission.

At step S116, judgment is carried out as to whether a given time has passed or not. If YES, that is, when it is judged that the given time has passed, the operation flow goes to END finishing the control flow. While, if NO, that is, when it is judged that the given time has not passed yet, the operation flow goes back to step S114 to repeat the operations of steps S114 and S116.

Since the gradient (or reduction rate) used at step S114 is set in accordance with the type of the vehicle, there are some cases where the gradient (or reduction rate) is set large as compared with the gradient (or reduction rate) used by the inertial phase control.

Since advantageous operation effects of the third embodiment are substantially the same as those of the above-mentioned first embodiment, explanation on the same will be omitted.

In the third embodiment, the operations of steps S110, S112 and S114 correspond to inhibiting means, the operation of step S106 corresponds to engaging pressure correction means for the releasing side frictional element 23 and the operation of step S114 corresponds to gradient correction means.

That is, when, before completion of the inertia phase control by which the engaging pressure of the releasing side frictional element 23 is gradually lowered, an accelerator pedal is depressed under a condition wherein the engaging pressure of the releasing side frictional element 23 keeps a value higher than the given value, the operation flow goes back from step S112 to step S106 for repeating inertial phase control. That is, even in such case, the inertial phase control is carried out wherein a correction is suitably made to the engaging pressure of the releasing side frictional element 23 in accordance with the throttle open degree. Furthermore, when, before completion of the inertia phase control by which the engaging pressure of the releasing side frictional element 23 is gradually lowered, an accelerator pedal is depressed under a condition wherein the engaging pressure of the releasing side frictional element 23 is lower than the given value, the operation flow goes from step S112 to step S114 to carry out the oblique omission chamfer control. Due to function of this oblique omission chamfer control, the pressure increasing correction for the releasing side frictional element 23 in accordance with the throttle open degree is not carried out (that is, the correction is inhibited) even if the accelerator pedal is depressed, and thus the control is so made as to bring the hydraulic pressure to the minimum value (viz., zero hydraulic pressure) by using a gradient (viz., reduction rate) that is smaller than the gradient set in the inertial phase control. With such control, undesired shift shock is suppressed or at least minimized even though the control responds to the throttle open degree.

Fourth Embodiment

In the following, a fourth embodiment of the present invention will be described with reference to FIG. 10.

Since the basic construction of the fourth embodiment is substantially the same as that of the above-mentioned first embodiment, only portions that are different from those of the first embodiment will be described in the following.

Figure 10:
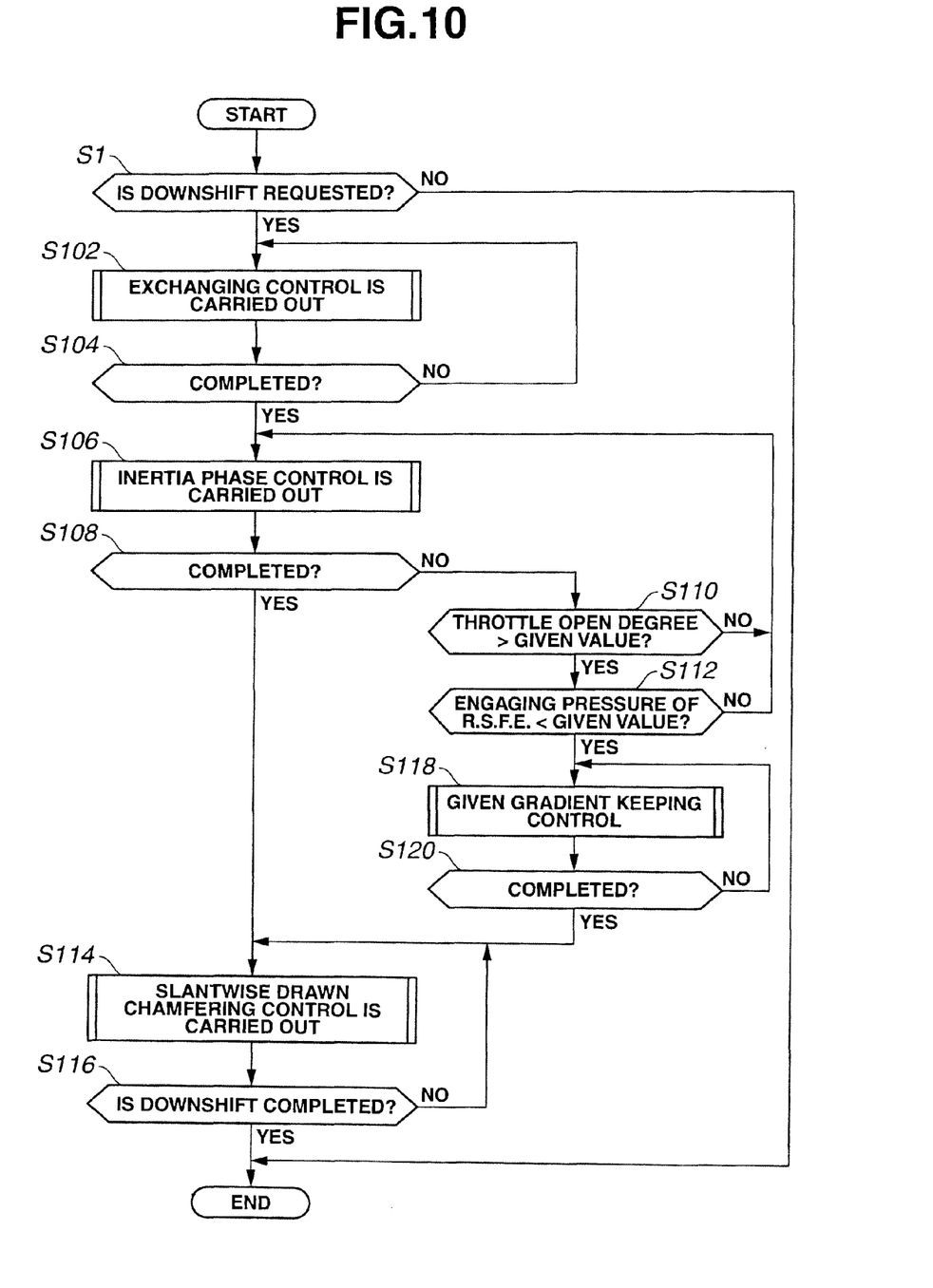
FIG. 10 is a flowchart showing programmed operation steps that are executed when a downshift speed change control is carried out in a fourth embodiment of the present invention.

FIG. 10 is a flowchart that depicts programmed operation steps executed by a control unit when a downshift speed change control is carried out in the fourth embodiment.

In the above-mentioned third embodiment, when the engaging pressure of the releasing side frictional element 23 is lower than the given value, the operation flow goes from step S112 to the step S114 of the oblique omission chamfer control in which the pressure increasing correction is inhibited.

While, in the fourth embodiment, when the engaging pressure of the releasing side frictional element 23 is lower than the given value, the operation flow goes from step S112 to step S118 to carry out a so-called given gradient keeping control. That is, in this control, the pressure increasing correction is inhibited and the engaging pressure of the releasing side frictional element 23 is reduced with a gradient (viz., reduction rate) that is the same as the gradient (viz., reduction rate) set at step S106 of the inertia phase control. In other words, in the fourth embodiment, between step S112 and step S114, there are provided steps S118 and S120 through which the given gradient keeping control is carried out with the gradient (viz., reduction rate) that has been set at the inertial phase control (viz., S106).

Once the given gradient keeping control is finished at step S118, the operation flow goes to step S120.

At step S120, judgment is carried out as to whether or not a detected gear ratio has reached to a given gear ratio close to a gear ratio established when the speed change is completed. If YES, that is, when it is judged that the detected gear ratio has reached to the given gear ratio, the operation flow goes to step S114 judging that the given gradient keeping control has been completed. While, if NO, that is, when it is judged that the detected gear ratio has not reached to the given gear ratio yet, the operation flow goes back to step S118 judging that the given gradient keeping control has not been completed yet, and selectively repeats the operations of steps S118 and S120 until completion of the given gradient keeping control.

Since advantageous operation effects of the fourth embodiment are substantially the same as those of the first embodiment, explanation on the same will be omitted.

Although the above description is directed to an automatic transmission mounted on a motor vehicle powered by an engine (viz., internal combustion engine or the like), the present invention is also applicable to an automatic transmission mounted on a hybrid type motor vehicle or an electric motor vehicle.

In case of reducing the engaging pressure of the releasing side frictional element 23, other correction processing may be employed so long as it is not a pressure increasing correction that increases the engaging pressure of releasing side frictional element 23 after the engaging pressure becomes lower than the given value.

The entire contents of Japanese Patent Application 2011-021672 filed Feb. 3, 2011 and Japanese Patent Application 2012-011808 filed Jan. 24, 2012 are incorporated herein by reference.

Although the invention has been described above with reference to the embodiments of the invention, the invention is not limited to such embodiments as described above. Various modifications and variations of such embodiments may be carried out by those skilled in the art, in light of the above description.

What is claimed is:

1. A speed change control device of an automatic transmission, the automatic transmission transmitting a torque inputted thereto from a power unit to an output shaft thereof while changing a rotation speed of the output shaft to a desired speed,
the speed change control device comprising:
a first control section that, upon detecting a speed change instruction for a speed change from a first given speed to a second given speed, carries out the speed change by reducing an engaging pressure of a releasing side frictional element that has established the first given speed and increasing an engaging pressure of an engaging side frictional element that would establish the second given speed;
a second control section that carries out a correction processing to increase the engaging pressure of the releasing side frictional element when a throttle open degree is increased during the speed change carried out by the first control section; and
a third control section that inhibits the correction processing of the second control section when the engaging pressure of the releasing side frictional element is lower than a given value.

2. A speed change control device of an automatic transmission as claimed in claim 1, further comprising a control section by which a rotation speed of the power unit is controlled during the speed change by the first control section.

3. A speed change control device of an automatic transmission as claimed in claim 1, in which the releasing side frictional element comprises drive and driven clutch plates, a piston that presses the drive and driven clutch plates to unite the drive and driven clutch plates upon receiving a hydraulic power, and a return spring that biases the piston in a direction to release the drive and driven clutch plates.

4. A speed change control device of an automatic transmission as claimed in claim 3, in which the given value set by the third control section corresponds to a biasing force produced by the return spring.

5. A speed change control device of an automatic transmission as claimed in claim 1, in which the first control section reduces the engaging pressure of the releasing side frictional element with a first given reduction rate during the speed change.

6. A speed change control device of an automatic transmission as claimed in claim 5, further comprising a fourth control section which, when the throttle open degree is increased and the engaging pressure of the releasing side frictional element is lower than the given value, reduces the engaging pressure of the releasing side frictional element with a second given reduction rate that is smaller than the first given reduction rate.

7. A speed change control device of an automatic transmission as claimed in claim 1, in which the third control section comprises:
means for carrying out a judgment as to whether the throttle open degree is greater than a given degree or not;
means for carrying out a judgment as to whether the engaging pressure of the releasing side frictional element is smaller than the given value; and
means for carrying out an oblique omission chamfer control, the oblique omission chamfer control being a control in which the engaging force of the releasing side frictional element that has been lowered by an inertial phase control is gradually lowered with a reduction rate that is smaller than the reduction rate set in the inertial phase control.

8. A speed change control device of an automatic transmission as claimed in claim 7, in which the second control section comprises means for carrying out an inertial phase control, the inertial phase control being a control in which the engaging pressure of the releasing side frictional element is gradually reduced with a reduction rate set in accordance with an input torque and a vehicle speed.

9. A speed change control device of an automatic transmission as claimed in claim 6, in which the fourth control section comprises means for carrying out an oblique omission chamfer control, the oblique omission chamfer control being a control in which the engaging force of the releasing side frictional element that has been lowered by the inertial phase control is gradually lowered with a reduction rate that is smaller than the reduction rate set in the inertial phase control.

10. A speed change control device of an automatic transmission as claimed in claim 7, in which the third control section further comprises means for carrying out a given gradient keeping control, the given gradient keeping control being a control in which the engaging pressure of the releasing side frictional element is gradually reduced while keeping the reduction rate that has been set in the inertial phase control.

11. A speed change control system of an automatic transmission, the automatic transmission transmitting a torque inputted thereto from a power unit to an output shaft thereof while changing a rotation speed of the output shaft to a desired speed,
the speed change control system comprising:
first means that, upon detecting a speed change instruction for a speed change from a first given speed to a second given speed, carries out the speed change by reducing an engaging pressure of a releasing side frictional element that has established the first given speed and increasing an engaging pressure of an engaging side frictional element that would establish the second given speed;

second means that carries out a correction processing to increase the engaging pressure of the releasing side frictional element when a throttle open degree is increased during the speed change carried out by the first control section; and third means that inhibits the correction processing of the second control section when the engaging pressure of the releasing side frictional element is lower than a given value.

12. A method of controlling an automatic transmission, the automatic transmission transmitting a torque inputted thereto from a power unit to an output shaft thereof while changing a rotation speed of the output shaft to a desired speed, the method comprising in steps:

detecting a speed change instruction for a speed change from a first given speed to a second given speed;

carrying out the speed change by reducing an engaging pressure of a releasing side frictional element that has established the first given speed and increasing an engaging pressure of an engaging side frictional element that would establish the second given speed;

carrying out a correction processing to increase the engaging pressure of the releasing side frictional element when a throttle open degree is increased during the speed change carried out by the first control section; and inhibiting the correction processing of the second control section when the engaging pressure of the releasing side frictional element is lower than a given value.

* * * * *